(12) United States Patent
Kamei

(10) Patent No.: US 11,768,879 B2
(45) Date of Patent: Sep. 26, 2023

(54) ADVICE PRESENTATION SYSTEM

(71) Applicant: Masamichi Kamei, Tokyo (JP)

(72) Inventor: Masamichi Kamei, Tokyo (JP)

(73) Assignee: LAND BUSINESS CO., LTD., Tokyo (JP)

( * ) Notice: Subject to any disclaimer, the term of this patent is extended or adjusted under 35 U.S.C. 154(b) by 205 days.

(21) Appl. No.: 17/433,291

(22) PCT Filed: Feb. 20, 2020

(86) PCT No.: PCT/JP2020/006831
§ 371 (c)(1),
(2) Date: Aug. 24, 2021

(87) PCT Pub. No.: WO2020/179478
PCT Pub. Date: Sep. 10, 2020

(65) Prior Publication Data
US 2022/0138263 A1    May 5, 2022

(30) Foreign Application Priority Data

Mar. 5, 2019  (JP) ................................. 2019-040028

(51) Int. Cl.
*G06F 16/9035* (2019.01)
*G06F 16/906* (2019.01)
(Continued)

(52) U.S. Cl.
CPC ........ *G06F 16/9035* (2019.01); *G06F 16/906* (2019.01); *G06F 16/90328* (2019.01); *G06F 16/90335* (2019.01)

(58) Field of Classification Search
CPC ............... G06F 16/9035; G06F 16/906; G06F 16/90335; G06F 16/90328
(Continued)

(56) References Cited

U.S. PATENT DOCUMENTS 8,285,654 B2 * 10/2012 Bajrach ................ G11B 27/031
706/14
2003/0181795 A1 * 9/2003 Suzuki ................... A61B 5/749
600/300
(Continued)

FOREIGN PATENT DOCUMENTS

EP        3 293 691 A1    3/2018
JP       2003-186881 A    7/2003
(Continued)

OTHER PUBLICATIONS

East, Marlene Lynette, et al., "Mental Health Mobile Apps: From Infusion to Diffusion in the Mental Health Social System", JMIR Mental Health, vol. 2, No. 1, e10, published Mar. 31, 2015, pp. 1-14.*

(Continued)

*Primary Examiner* — Robert Stevens
(74) *Attorney, Agent, or Firm* — Pearne & Gordon LLP

(57) ABSTRACT

An advice presentation system that combines functions of a terminal such as a smartphone, advice data such as famous or wise sayings that have been stored in a database, and functions such as a communications channel together, and provides appropriate advice according to the emotions of a user at that time. Firstly, emotion-related data pertaining to the emotions of the user is entered from the terminal. The advice presentation system connects to a web server via Internet connection, and emotion data corresponding to the entered emotion-related data is selected and extracted from an emotion database by using an emotion data selection means for an application server. At least one piece of advice data stored in an advice database is selected and extracted by an advice data selection means for the application server, on the basis of the selected emotion data. The selected advice data is sent to the terminal of the user, and famous or wise (Continued)

sayings, etc., are presented from an advice display means as advice data.

8 Claims, 3 Drawing Sheets

(51) Int. Cl.
  *G06F 16/903* (2019.01)
  *G06F 16/9032* (2019.01)
(58) Field of Classification Search
  USPC ........................................................ 707/748
  See application file for complete search history.

(56) References Cited

U.S. PATENT DOCUMENTS

| | | | |
|---|---|---|---|
| 2003/0195398 A1* | 10/2003 | Suzuki ................. | A61B 5/4035 705/14.1 |
| 2008/0105482 A1* | 5/2008 | Yamaguchi ............ | G05B 15/02 180/271 |
| 2009/0055210 A1* | 2/2009 | Noda ..................... | G06Q 10/10 705/319 |
| 2009/0156887 A1* | 6/2009 | Hsu ....................... | A61M 21/02 600/27 |
| 2009/0276368 A1 | 11/2009 | Martin et al. | |
| 2012/0101966 A1 | 4/2012 | van Coppenolle et al. | |
| 2013/0097110 A1 | 4/2013 | Kwon | |
| 2014/0040184 A1 | 2/2014 | Benissan | |
| 2014/0277735 A1 | 9/2014 | Breazeal | |
| 2014/0282089 A1* | 9/2014 | West ..................... | H04M 3/565 715/753 |
| 2015/0154721 A1* | 6/2015 | Thompson ............. | G06Q 10/10 705/2 |
| 2015/0350201 A1 | 12/2015 | Cornell et al. | |
| 2016/0188674 A1* | 6/2016 | Han ....................... | G06Q 30/02 707/737 |
| 2016/0317074 A1* | 11/2016 | Kawai ................... | G06F 16/2228 |
| 2018/0075490 A1 | 3/2018 | Chintalapoodi et al. | |
| 2019/0161088 A1* | 5/2019 | Goto ..................... | G06V 20/597 |
| 2021/0019339 A1* | 1/2021 | Ghulati .................. | G06F 21/10 |

FOREIGN PATENT DOCUMENTS

| | | |
|---|---|---|
| JP | 2008-204193 A | 9/2008 |
| JP | 4451038 B2 | 4/2010 |
| JP | 2013-186764 A | 9/2013 |
| JP | 6112328 B1 | 4/2017 |
| JP | 2018-041460 A | 3/2018 |
| JP | 6362286 B1 | 7/2018 |
| JP | 2018-163409 A | 10/2018 |
| WO | 2016/178329 A1 | 11/2016 |

OTHER PUBLICATIONS

Bhaskar, Jasmine, et al., "Hybrid Approach for Emotion Classification of Audio Conversation Based on Text and Speech Mining", Procedia Computer Science, vol. 46, © 2015, pp. 635-643.*
Ghandeharioun, Asma, et al., "'Kind and Grateful': A Context-Sensitive Smartphone App Utilizing Inspirational Content to Promote Gratitude", Psych Well-Being, vol. 6, No. 9, Epub: Jul. 4, 2016, pp. 1-21.*
Hetrick, Sarah Elisabeth, et al., "Youth Codesign of a Mobile Phone App to Facilitate Self-Monitoring and Management of Mood Symptoms in Young People With Major Depression, Suicidal Ideation, and Self-Harm", JMIR Ment. Health, vol. 5, issue 1, e9, © 2018, pp. 1-14.*
Canadian Examination Report issued in corresponding application 3,131,233; dated Feb. 10, 2023, 5 pages.
International Search Report for corresponding International Application No. PCT/JP2020/006831 dated Mar. 17, 2020, 5 pages.
Takaoka et al., "Words-of-Wisdom Search based on Multi-dimensional Sentiment Vector", IPSJ SIG Technical Report, 2011, 8 pages.
Kuhn, D., "Mood Advisor Based on a User's Online and Device Activity," ip.com, Jul. 15, 2014, 15 pages.
Campos, P. F., "You Are Okay: Towards User Interfaces for Improving Well-being", Madeira-ITI, University of Madeira, Campus da Penteada, Funchal, Portugal, Mar. 5, 2018, 4 pages.
Extended European Search Report issued in corresponding application, EP 20 76 6982; dated: Sep. 28, 2022, 2 pages.
Office Action issued in corresponding Australian application, 2020232521; dated: Aug. 25, 2022, 5 pages.

* cited by examiner

ADVICE PRESENTATION SYSTEM

TECHNICAL FIELD

This invention relates to an advice presentation system that enables famous or wise sayings appropriate for the emotions of a user at that time to be extracted and presented as advice by entering information pertaining to the emotions of the user to a terminal such as a smartphone and a personal computer.

BACKGROUND ARTS

With the wide spread of mobile terminals such as a smartphone and a tablet PC as well as personal computers, various pieces of application software or systems capable of instantly responding to the request of a user via a communications channel have been developed.

For instance, a patent document 1 below discloses an advice system that extracts an emotion-related keyword included in a character string for words uttered by a consultant user on the basis of the character string and selects advice to the consultant user by using the extracted keyword.

Specifically, the advice system disclosed in the patent document 1 is to provide an appropriate advice answer to a consultant user on the basis of the content of words uttered by the consultant user, and comprises an acquisition means for acquiring voice information of the consultant user; a voice recognition means for specifying a character string corresponding to the voice information acquired by the acquisition means on the basis of the acquired voice information; an attribute storage means for storing advice to the consultant user every attribute of consultation; and an estimation means for extracting emotion-related keyword and emphatic word from the specified character string, then estimating a degree of emotions that the consultant user holds with respect to a keyword different from the emotion-related keyword on the basis of the extracted emotion-related keyword and emphatic word, and selecting prescribed advice from the attribute storage means on the basis of the estimated degree of emotions and the keyword different from the emotion-related keyword to provide the advice to the consultant user.

A patent document 2 below discloses a supplement search system that is to notify a customer having taken in food or drink in a restaurant or a Japanese-style pub also called Izakaya about an optimum supplement that should be ingested for improvement of the health conditions, on the basis of the nutrients that the customer has ingested.

Specifically, the supplement search system disclosed in the patent document 2 comprises a totalization means for totalizing actual intakes of nutrients based on input data representing the food and drink items that have been ordered; an analyzation means for analyzing a tendency of deviation between a total intake of nutrients totalized by the totalization means and a preliminarily acquired ideal intake of nutrients; a relevant supplement database that preliminarily stores relevancy including at least a three-staged degree of relevance between the tendency of deviation and the kind of supplements to be supplementarily supplied; and a search means for performing search of at least one kind of supplements on the basis of the tendency of deviation analyzed by the analyzation means with reference to the relevancy stored in the relevant supplement database.

A patent document 3 below discloses an information processing device that is aimed at resolving such problem that the emotions of one sentence creating person at the time when creating a sentence fail to correctly reach the other person who reads it, so that some misunderstanding for communications arises, and consequently, a relationship between the persons concerned might get worse, and this image processing device comprises an emotion information acquisition means for acquiring emotion information of a person who creates sentence information; and a recommendation information notification means for giving notice of recommendation information on the basis of the emotion information acquired by the emotion information acquisition means, wherein a recommendation setting part acquires the emotion information from an emotion information estimation part and permits advice corresponding to the acquired emotion information to be set at an annotation as the recommendation information, and a filtering part filters the annotation corresponding to a prescribed emotion and outputs annotated document information from an output part.

A patent document 4 below discloses an interactive health promotion system that has been developed with the object of providing a system capable of performing user-friendly interaction as if having a dialogue with someone in order to make a system user have persistently a certain emotion essential to persons in continuing one's efforts in a repetitive manner through interaction with the system.

Specifically, the interactive health promotion system disclosed in the patent document 4 comprises a user identification information holding part for holding user identification information for identification of a user who is a SNS (or Social Networking Service) user; a SNS user-related information acquisition part for acquiring, as external information, SNS user-related information being user-related information including what the user said on the SNS actually utilized by the user, in association with the user identification information; an analysis rule holding part for holding an analysis rule being a rule for analyzation of the external information in association with the user identification information from the aspect of grasping of the health conditions to acquire health condition information; a health condition information analysis acquisition part for acquiring the health condition information on the basis of both the acquired external information associated with the user identification information and the analysis rule associated with the same user identification information; a dialogue information storage part that stores dialogue information to be sent in accordance with the health condition information acquired in association with the user identification information; a user-basis dialogue information selection rule holding part for holding a user-basis dialogue information selection rule being a rule associated with the user identification information for selection of the stored dialogue information on the basis of the acquired health condition information; a dialogue information selection part for selecting the dialogue information from the dialogue information storage part on the basis of both the acquired health condition information and the held user-basis dialogue information selection rule, and performing conversion into interactive dialogue information that meets the characteristics for every user; and a dialogue information output part for outputting the selected dialogue information via the SNS to the user identified by the user identification information.

A patent document 5 below discloses an information processing system that is allowed to grasp the emotions of a communication partner on the basis of signals issued in response to body and hand gestures, voice tones, talkativeness or nodding actions of the communication partner, thereby generating advice for establishment of an ideal communication state.

Specifically, the information processing system disclosed in the patent document 5 comprises a purpose-of-use setting part for setting the purpose of use for communications between a first user and a second user; a communication part for receiving an emotion signal of at least either one of the first and the second users; a generation part for generating advice to the first user on the basis of an ideal communication state that meets the purpose of use of the received emotion signal; and a control part for sending the generated advice to a client terminal corresponding to the first user via the communication part.

A patent document 6 below states that in regards to one technology for assignment of a tag to a Japanese sentence, this technology is allowed to perform retrieval of various famous phrases in accordance with the feelings or emotions of a user at that time, in cases where the Japanese sentence contains various wise sayings, or the tag assigned to the Japanese sentence falls into a category of emotion tags, feeling tags or sensation tags.

A patent document 7 below states that in regards to an advice recommendation system that determines the mental state of a user in real time and recommends advice for individuals to the user in accordance with the determined mental state of the user, this advice recommendation system is allowed to perform processing such as of collecting user condition information and/or user profile information from a sensor or a terminal and of permitting a user mental state index corresponding the user condition information to be preliminarily stored in a user information database, and thereby comparing the collected user condition information with the user condition information preliminarily stored in the user information database to perform retrieval of the user mental state index.

A patent document 8 below states that in regards to an advice system that provides advise to a consultant user, this advice system is allowed to perform processing such as of estimating emotion information on the basis of a character string specified by a voice recognition part and of making judgement of the emotions in accordance with an emotion classification table or an emotion degree table.

PRIOR ART DOCUMENTS

Patent Documents

Patent document 1: Japanese Patent Publication No. 4451038
Patent document 2: Japanese Patent Publication No. 6112328
Patent document 3: Japanese Unexamined Patent Application Publication No. 2018-163409
Patent document 4: Japanese patent Publication No. 6362286
Patent document 5: International Unexamined Patent Application No. 2016/178329
Patent document 6: Japanese Unexamined Patent Application Publication No. 2013-186764
Patent document 7: Specification of U.S. Unexamined Patent Application Publication No. 2013/0097110
Patent document 8: Japanese Unexamined Patent Application Publication No. 2003-186881

SUMMARY OF THE INVENTION

Problems to be Solved by the Invention

Throughout the human history, a lot of words called as famous or wise sayings or proverbs such as words of philosophers, religious leaders or great persons of the past have been in existence in every country of the world since ancient times and also have been handed down as words that might affect someone's own life or encourage someone. Meanwhile, even in modern times, various words uttered by well-known entrepreneurs, politicians, athletes or talents have been widely in use as instructive or advisory words.

These kinds of words have been heretofore often presented in the form of being collected into books or dictionaries called a collection of famous sayings or of wise sayings, and the number of words contained therein is considered to be huge. Meanwhile, it has recently become easy to perform retrieval of these famous or wise sayings via Internet connection.

It would be of course meaningful to read these books, whereas it is not easy to instantly find out such words as to appropriately respond to the feelings of someone at the time when wanting to get some advice secretly in order to overcome one's own hard or sad experiences, for instance.

An object of the present invention is to provide an advice presentation system that combines functions of a terminal such as a smartphone, a tablet PC and a personal computer, data such as famous or wise sayings having been stored in a database and functions such as a communications channel together, thereby instantly providing appropriate advice according to the emotions of a user at that time.

Means for Solving the Problems

An advice presentation system of the present invention comprises a data input means for entering at least one piece of emotion-related data pertaining to the emotions of a user to a terminal; an emotion database that stores human emotions as emotion data while classifying the same; an advice database that stores words regarded as advice including famous or wise sayings, proverbs or words of philosophers or religious leaders as advice data while classifying the same in association with the human emotions; an emotion data selection means for selecting at least one piece of emotion data from the emotion database on the basis of at least one piece of emotion-related data entered by the data input means; an advice data selection means for selecting more than one piece of advice data from the advice database on the basis of the emotion data selected by the emotion data selection means; a priority addition means for adding priority to the more than one piece of advice data in the order of descending correlation between the advice data and the emotion data; and an advice display means for displaying the words of advice on the basis of the advice data to which the priority is added by the priority addition means.

Examples of the advice data include the wise sayings of philosophers, thinkers and religious leaders, i.e., those of Socrates, Plato, Aristoteles, Kant, Nietzsche, Sartre, Confucius, Mencius, Lao-tse, Moses, Christ, Mohammed, Buddha, Saicho, Kukai and Nichiren; the wise sayings of persons in authority, politicians and scholars, i.e., those of Napoleon Bonaparte, George Washington, Winston Churchill, Abraham Lincoln, Albert Einstein, Ieyasu Tokugawa and Shoin Yoshida; the wise sayings of top managements and entrepreneurs, i.e., those of Steve Jobs, Konosuke Matsushita and Soichiro Honda; and others including the wise sayings of athletes, authors, poets and entertainers; the various famous sayings, proverbs, legendary traditions and daily life's ingenuities that have been all handed down in every country of the world since ancient times; the various wise sayings and advices on medical science, psychology and health; movie and drama quotes; song lyrics; and musical masterpiece's phrases, for instance.

In the advice presentation system of the present invention, it is preferable that all or some of the emotion database, the advice database, the emotion data selection means and the advice data selection means are placed at an external server connected to the terminal via a communications channel, instead of inside the terminal.

While it is technically acceptable to install these databases and selection means onto the terminal, it is to be understood that placement of these databases and selection means at the external server is allowed to save a memory area of the terminal and also enables update of a database or a program having functions of a selection means, an arithmetic operation means or like means to be performed on the server side. Moreover, their placement at the external server is considered to be preferable also in the aspect of generation of big data by database expansion and of big data utilization.

As one mode of the advice presentation system of the present invention, there may be such mode that an input means and a display means both included in a terminal device such as a smartphone and a personal computer are made to serve as the data input means and the advice display means of this system and are connected to the external server via the communications channel such as Internet connection, thereby making use of the emotion database and/or the advice data selection means housed in the external server. Alternatively, the advice data selection means may be a program installed onto the terminal device.

When the terminal device is a mobile terminal such as a smartphone and a tablet PC, some of the emotion database, the advice database, the emotion data selection means and the advice data selection means may be also configured so as to be installed in the form of mobile applications.

The data input means generally makes use of a character input device, a voice input device or a touch panel of the terminal and may be also configured so as to be capable of using these input devices in combination or in a selective manner.

Particularly, when using the smartphone and the like as the terminal, a voice input device and/or its voice recognition function of the smartphone can be used, and meanwhile, use of a device and/or a mechanism having a recognition function for recognition of the emotions and/or health conditions of the user in combination on the basis of an input voice enables recognized data to be also used as part of input data such as the emotion-related data.

The emotion data selection means in the present invention is operated by a program prepared for selection of the emotions of the user during use from the emotion data stored in the emotion database, on the basis of character data and voice data both having been entered from the data input means or other input signals. When there exist many kinds of input data, and besides, the emotion data is in the form of finely subdivided data, the emotion data selection means may be configured so as to have an interface function provided with complicated algorithm. Meanwhile, use of a program having an AI (or Artificial Intelligence) function is effective to deal with user's optional input.

The advice presentation system of the present invention may further comprise at least one database among a personal element database that stores personal features including sex and age as personal element data while classifying the same, an environmental element database that stores at least one of elements such as education, employment, career, birthplace and residential area as environmental element data while classifying the same and a fluctuating element database that stores fluctuating elements including at least one of health, time and weather as fluctuating element data while classifying the same.

Namely, at least one piece of data among the personal element data, the environmental element data and the fluctuating element data all having been entered from the data input means is sent to the selection means to perform selection of advice data on the basis of a combination of the sent element data and the emotion data, thereby resulting in enabling more appropriate advice meeting the individuality and/or environment of the user to be selected and presented.

For instance, some advice that the user wants might be largely different depending on whether the user is a male user or a female user, in which case, selection of more appropriate advice is sometimes achievable by exclusion of advice data deemed to be inappropriate as advice for the male or female user.

Meanwhile, because of the fact that there are a large number of famous or wise sayings that are hard for children or young people to understand at all, and besides, the preference of the user might vary depending on an age group, it is preferable to achieve selection of more appropriate advice by including the age as one decision-making element in selection of the advice data. Further, it may be possible also to include data pertaining to height, weight or like physical constitution regarded as the personal features.

In terms of the environmental element data, it can be considered that the education, employment and career might have effect on the preference and/or individuality of the user, and besides, some appropriate advice requested might vary depending on the birthplace and the residential area, that is, which country or which area of the country the user is from or is now living, so that these elements shall be also defined as advice data selection elements.

Further, a display language switching function may be provided to perform selection of a display language on a country-by-country basis, and/or expansion of multilingual data may be performed to respond to the request of the user for more information on the famous or wise sayings in the original language.

For the emotions that are not expressible only by a word such as fun, happy, sad, hard and frustrating, it may be possible also to provide such configuration as to store, as the fluctuating element data, the health conditions of the user during use, the time at which the present time is included in a morning time zone, a daytime zone or a nighttime zone and the weather on that day such that it is fine, cloudy, rainy, snowy or stormy, thereby performing selection of the advice data in consideration of the effect of these fluctuating elements on the emotions of the user.

Further, in the advice presentation system of the present invention, selection of advice data may be performed under a condition that the number of pieces of advice data to be selected is preferably more than one or in great number without needing to be limited to one. In this case, the advice data may be displayed with the priority added thereto in the order of descending correlation between the emotion data and more than one piece of selected advice data, or alternatively, may be provided by way of audio output.

It may often happen that a single piece of selected advice is not so best for the user. Thus, more than one piece of advice shall be presented, thereby resulting in allowing the user to accept or ignore the presented advice on the basis of one's own emotions and/or judgment.

Further, the advice to which the priority is added is presented with a large number of characters or by way of audio output, thereby resulting in providing an effect of making the user gradually feel at ease even when the user feels a sense of urgency. It is to be noted that more than one piece or many pieces of selected advice may be displayed in a random order or provided by way of audio output without adding the priority thereto.

MODE FOR EMBODYING THE INVENTION

Hereinafter will be described the present invention with reference to the attached drawings.

Figure 1:
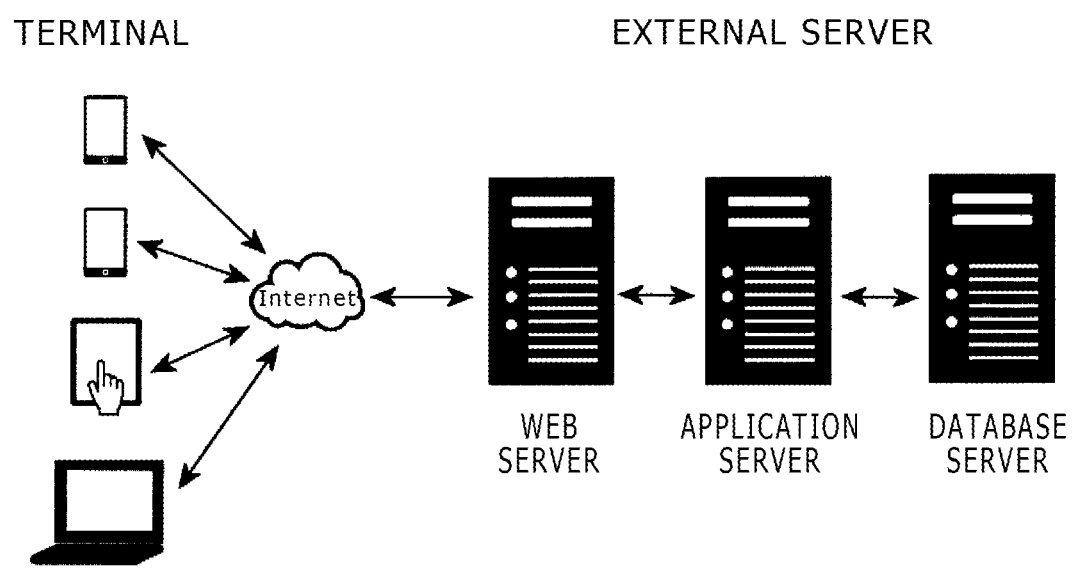
FIG. 1 is a view schematically showing an overall configuration of system configuration equipment in one embodiment of an advice presentation system of the present invention.

FIG. 1 is a view schematically showing an overall configuration of system configuration equipment in one embodiment of an advice presentation system of the present invention.

As shown in FIG. 1, the system of the present invention is configured such that access to an external server operated by a system operator is performed from a terminal operated by a user, such as a smartphone and a tablet PC, via a communications channel such as Internet connection, thereby resulting in enabling appropriate advice meeting the emotions of a user at that time to be presented from an advice database that stores advice data such as famous or wise sayings.

While the external server may be configured of some pieces of equipment such as a web server for access management, an application server with an incorporated program for system operations and a database server that stores at least one database for use in the present system as shown in FIG. 1, it can be considered that there are various other patterns for an external server configuration without being limited to the above.

Figure 2:
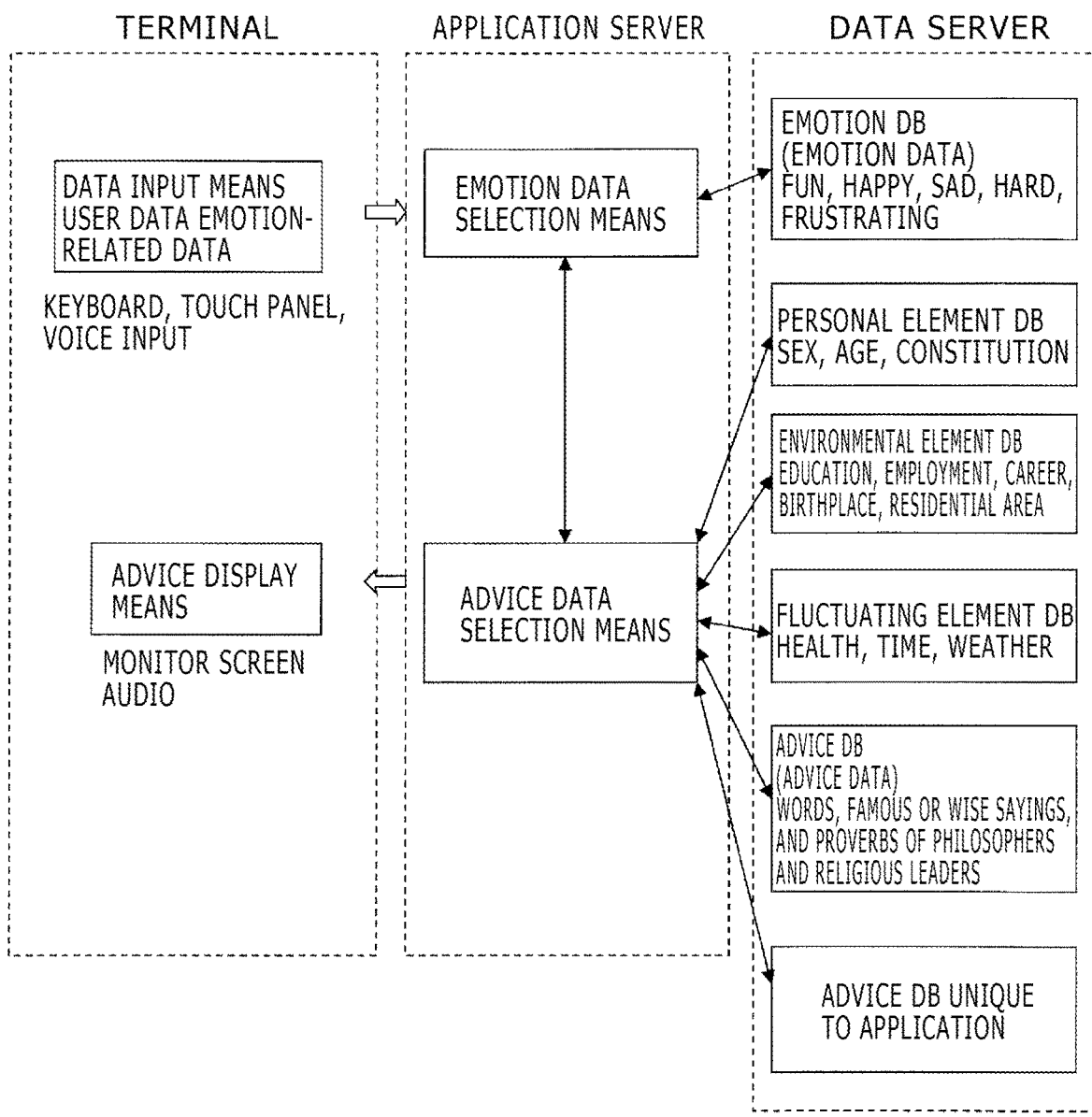
FIG. 2 is a block diagram in one embodiment of the advice presentation system of the present invention.

FIG. 2 is a block diagram in one embodiment of the advice presentation system of the present invention.

A data input device of a terminal such as a smartphone, a tablet PC and a personal computer can be used as a data input means, and data pertaining to the user and/or emotion-related data pertaining to the emotions of the user at that time is entered from the data input means.

For instance, a character input device such as a keyboard and a touch panel and a voice input device are applicable to the data input device. When using a terminal having a spoken language recognition function and/or an interactable AI function, use of these functions is possible as well.

Examples of the data pertaining to the user include account information for use of the system and user information including sex, age, education, employment, career, birthplace and residential area, for instance.

When causing all or some pieces of data pertaining to the user to be stored in the database of the system, the need for performing data input every time can be eliminated.

The emotion-related data is indicative of data pertaining to the emotions of the user at that time, and while a word such as fun, happy, sad, hard and frustrating can be entered intact, it is to be understood that use of data pertaining to the user emotions grasped by input of words in the form of sentence, an interactive function or a voice recognition function or alternatively, use of various forms of emotion-related data in a compounded manner will do without being limited to use of the above words.

The emotion-related data entered by the data input means is compared with the emotion data stored in an emotion database inside the data server by using an emotion data selection means included in a program installed onto the application server, so that at least one piece (preferably, many pieces) of emotion data to be used for extraction of advice data is selected.

Referring to FIG. 2, while there are shown some words that are respectively indicative of the emotions such as fun, happy, sad, hard and frustrating as examples, it is to be understood that classification of the human emotions is actually performed in a more detailed manner, and a combination of the emotions is selected by the emotion data selection means, thereby resulting in enabling more appropriate advice data to be extracted from the advice database.

The advice data selection means serves as a function included in the program installed onto the application server together with the emotion data selection means and is to perform selection and extraction of the advice data stored in the advice database inside the data server on the basis of the emotion data or usually, many pieces of emotion data selected by the emotion data selection means.

The advice data is indicative of the famous or wise sayings of philosophers or religious leaders and the proverbs all having been classified in association with the emotion data, for instance. While extraction of only one piece of advice data is realizable, it is to be understood that in a usual condition, more than one piece, preferably, many pieces of advice data shall be selected. The selected advice data is sent to the terminal with the priority added thereto or in a random order, followed by being displayed on an advice display means such as a monitor screen of the terminal. Alternatively, audio output may be applied also to presentation of the advice data.

The number of pieces of advice data to be selected can be also controlled by input operation at the terminal.

Extraction of the advice data by the advice data selection means can be performed without being limited to selection based on only the emotion data, in which case, as shown in FIG. 2, for instance, the data server may be also configured so as to further have a personal element database that stores personal features such as sex, age and physical constitution as personal element data while classifying the same, an environmental element database that stores elements such as education, employment, career, birthplace and residential area as environmental element data while classifying the same and a fluctuating element database that stores fluctuating elements such as health conditions, time and weather as fluctuating element data while classifying the same, thereby allowing the user data entered from the data input means to be added as decision-making elements in selection and extraction of the advice data.

Adding such configuration results in enabling more appropriate advice to be presented to the user.

In addition to the above, as show in FIG. 2, it may be possible also to provide such system configuration as to prepare a so-called "advice database unique to application" for storage of advice having been uniquely created by the system operator to provide regularly addable or updatable advice data, thereby enabling use of this advice database unique to application together with the usually used advice database that stores the famous or wise sayings.

Figure 3:
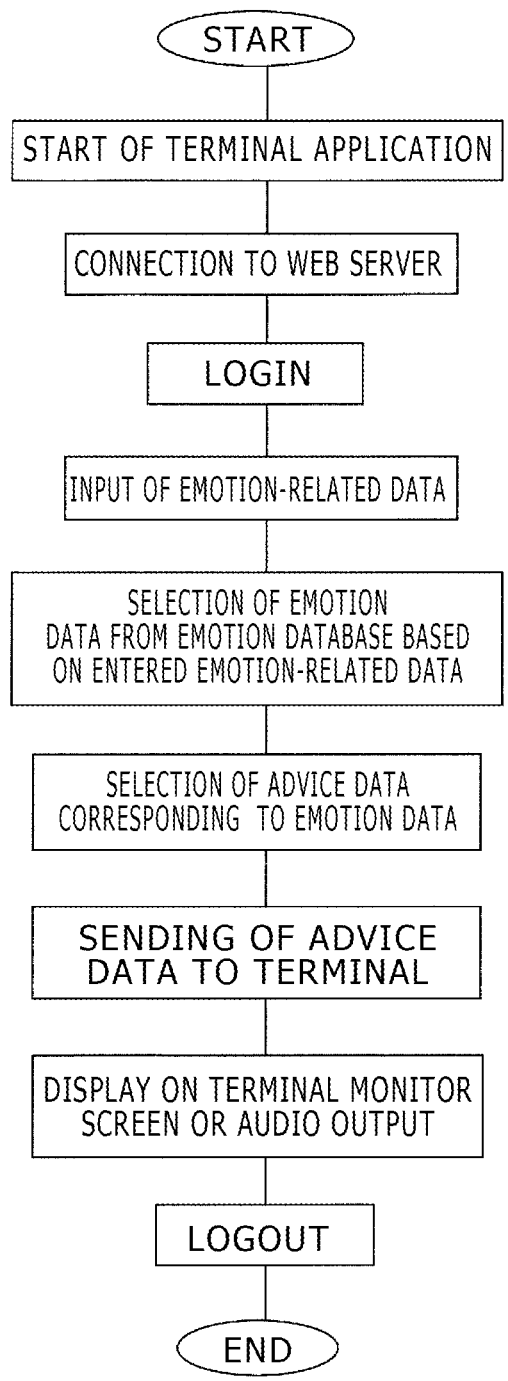
FIG. 3 is a flowchart in one embodiment of the advice presentation system of the present invention.

FIG. 3 is a flowchart showing the processing flow in the advice presentation system of the present invention in a simplified manner.

(1) Start of Terminal Application

An application of this system is started in the state of being installed onto the terminal such as the smartphone, the tablet PC and the personal computer, when power of the terminal is in an on state.

(2) Connection to Web Server

Connection between the terminal and the web server is made via the communications channel such as Internet connection. A method of connection to the webserver may be by an existing web browser, other than by an exclusive program.

(3) Login

Login to the web server is performed by input of the account information and passwords of the user.

(4) Input of Emotion-Related Data

The emotion-related data pertaining to the emotions of the user at that time is entered from the terminal. Input of the emotion-related data may be performed also by a voice input function of the smartphone, for instance.

(5) Selection of Emotion Data

At least one piece or usually, many pieces of advice data are selected and extracted from the emotion database on the basis of the entered emotion-related data by using the emotion data selection means of the program installed onto the application server.

(6) Selection of Advice Data

At least one piece or usually, many pieces of advice data are selected and extracted from the advice database on the basis of the selected emotion data by using the advice data selection means of the program installed onto the application server.

In regards to selection of the advice data, it may be possible also to provide such configuration as to perform selection and extraction of the advice data by using the emotion data together with the personal element data pertaining to the sex, age and physical constitution, the environment element data pertaining to the education, employment, career, birthplace and residential area and the fluctuating element data pertaining to the health conditions, time and weather.

(7) Sending of advice data to terminal

The advice data selected and extracted by the advice data selection means is sent to the terminal of the user.

(8) Display on terminal monitor screen or audio output

At least one piece of advice data received by the terminal of the user is displayed on the monitor screen of the terminal or presented to the user in an audio output manner.

Input of the emotion-related data in a step (4) is performed again by the user as needed, thereby repeating the processing flow up to a step (8).

(9) Logout

Logout is performed to terminate the application of the terminal.

The invention claimed is:

1. An advice presentation system comprising:
a data input means for entering at least one piece of emotion-related data pertaining to the emotions of a user to a terminal;
an emotion database that stores the human emotions as emotion data while classifying the same;
an advice database that stores words regarded as advice including famous or wise sayings, proverbs or words of philosophers or religious leaders as advice data while classifying the same in association with the human emotions;
an emotion data selection means for selecting at least one piece of emotion data from said emotion database on the basis of at least one piece of emotion-related data entered by said data input means;
an advice data selection means for selecting more than one piece of advice data from said advice database on the basis of the emotion data selected by said emotion data selection means;
a priority addition means for adding priority to said more than one piece of advice data in the order of descending correlation between said advice data and said emotion data; and
an advice display means for displaying the words of advice on the basis of said advice data to which the priority is added by said priority addition means.

2. The advice presentation system according to claim 1, wherein all or some of said emotion database, said advice database, said emotion data selection means and said advice data selection means are placed at an external server connected to said terminal via a communications channel.

3. The advice presentation system according to claim 1, wherein said data input means includes a character input device, a voice input device or a touch panel of said terminal.

4. The advice presentation system according to claim 1, wherein the emotion data selection means has an interface function that specifies a correspondence relation between character data and voice data both having been entered from said data input means or other input signals and the emotion data stored in said emotion database.

5. The advice presentation system according to claim 1, wherein the advice presentation system further comprises at least one database among a personal element database that stores personal features including sex and age as personal element data while classifying the same, an environmental element database that stores at least one of elements such as education, employment, career, birthplace and residential area as environmental element data while classifying the same and a fluctuating element database that stores fluctuating elements including at least one of health, time and weather as fluctuating element data while classifying the same, wherein at least one piece of data among said personal element data, said environmental data and said fluctuating element data all having been entered from said data input means is sent to said selection means to perform selection of said advice data on the basis of a combination of the sent element data and said emotion data.

6. The advice presentation system according to claim 5, wherein said personal element data further includes data pertaining to physical constitution regarded as the personal features.

7. The advice presentation system according to claim 1, wherein said data input means and said advice display means are respectively made to serve as an input means and a display means both included in a terminal device, said emotion database is housed in an external server connected to said terminal device via the communications channel, and said advice data selection means is housed in either said terminal device or said external server.

8. The advice presentation system according to claim 7, wherein said terminal device is a mobile terminal, and at least some of said emotion database, said advice database, said emotion data selection means and said advice data selection means are installed as mobile applications onto the mobile terminal.

\* \* \* \* \*